(12) United States Patent
Henderson et al.

(10) Patent No.: US 7,017,927 B2
(45) Date of Patent: Mar. 28, 2006

(54) POWER OPERATED RUNNING BOARD

(75) Inventors: Jack V. Henderson, West Bloomfield, MI (US); Gregory A. Brower, Fenton, MI (US)

(73) Assignee: Decoma International Inc., Concord (CA)

( * ) Notice: Subject to any disclaimer, the term of this patent is extended or adjusted under 35 U.S.C. 154(b) by 10 days.

(21) Appl. No.: 10/635,093

(22) Filed: Aug. 6, 2003

(65) Prior Publication Data

US 2004/0100063 A1   May 27, 2004

Related U.S. Application Data

(60) Provisional application No. 60/401,682, filed on Aug. 6, 2002.

(51) Int. Cl.
*B60R 3/02* (2006.01)

(52) U.S. Cl. ........................ 280/166; 280/163

(58) Field of Classification Search ............ 280/163, 280/164.1, 164.2, 166; 296/162; 182/91
See application file for complete search history.

(56) References Cited

U.S. PATENT DOCUMENTS

| | | | |
|---|---|---|---|
| 775,336 A | 11/1904 | Kratz | |
| 2,018,064 A | 10/1935 | Hofacker | |
| 2,125,085 A | 7/1938 | Pool | |
| 2,146,668 A | 2/1939 | Baade | |
| 2,492,068 A | 12/1949 | Schofield et al. | |
| 2,951,454 A | 9/1960 | Candlin, Jr. | |
| 3,887,217 A | 6/1975 | Thomas | |
| 4,188,889 A | 2/1980 | Favrel | |
| 5,228,707 A * | 7/1993 | Yoder | 280/166 |
| 5,358,268 A | 10/1994 | Hawkins | |
| 5,697,626 A | 12/1997 | McDaniel et al. | |
| 6,135,472 A | 10/2000 | Wilson et al. | |
| 6,158,756 A | 12/2000 | Hansen | |
| 6,270,099 B1 | 8/2001 | Farkash | |
| 6,375,207 B1 | 4/2002 | Dean et al. | |
| 6,382,650 B1 | 5/2002 | Farkash | |
| 6,641,158 B1 * | 11/2003 | Leitner | 280/166 |
| 6,830,257 B1 * | 12/2004 | Leitner | 280/166 |
| 2001/0024023 A1 | 9/2001 | Farkash | |
| 2002/0079668 A1 | 6/2002 | Farkash | |
| 2002/0113400 A1 | 8/2002 | Leitner | |

* cited by examiner

Primary Examiner—Jeff Restifo
(74) Attorney, Agent, or Firm—Clark Hill PLC

(57) ABSTRACT

A running board assembly accommodates access to a motor vehicle. The running board assembly includes a plurality of mounting brackets fixedly secured to the motor vehicle and extending therebelow. The running board assembly also includes a step movably secured to the plurality of brackets. The step defines a stepping surface and a peripheral edge extending around a portion of the stepping surface. The step is movable between a deployed position providing access to the stepping surface and a stowed position wherein the peripheral edge abuts the motor vehicle to cover the stepping surface during non-use.

2 Claims, 6 Drawing Sheets

POWER OPERATED RUNNING BOARD

CROSS-REFERENCE TO RELATED APPLICATION

This application claims priority to and all the benefits of U.S. Provisional Application No. 60/40 1,682, filed on Aug. 6, 2002.

FIELD OF THE INVENTION

The invention relates to running boards for motor vehicles. More particularly, this invention relates to a positionable running board which when stored appears as a rocker panel.

DESCRIPTION OF THE RELATED ART

Running boards have become a popular option for motor vehicles that have a high ground clearance, such as pick-up trucks and sport-utility vehicles. Typically, running boards include a platform or step defining a stepping surface extending longitudinally alongside the motor vehicle. The step supports individuals as they enter or exit the motor vehicle. The positioning of the running board alongside of the motor vehicle, however, exposes the stepping surface to outside elements.

For example, running boards often become coated with dirt and/or mud during motor vehicle operation on non-paved roads. The dirt and/or mud on the step can soil the clothing of an individual who utilizes the running board to enter or exit the motor vehicle. In addition, snow and ice can build up along the running boards when the motor vehicle is parked outside, also causing the stepping surface to become slippery. Finally, running boards are susceptible to being dented during motor vehicle operation in cities. Specifically, during parking of the motor vehicle along a street, the running board may be dented as it contacts a curb.

Due to these considerations, running boards have been developed that are movable between a deployed position for supporting an individual entering or exiting the motor vehicle, and a stowed position tucked underneath the motor vehicle. Typically, a motor is utilized to move the running board between positions. The step of these deployable running boards is, however, still susceptible to accumulation of various outside elements, such as dirt, mud, snow, or water, thereon since the stepping surface is not protected from elements outside the motor vehicle.

SUMMARY OF THE INVENTION

The disadvantages of the prior art may be overcome by providing a running board that moves between a deployed position and a stored position. In the stored position, the running board is hidden from view and appears as a rocker panel.

According to one aspect of the invention, there is provided a running board assembly that accommodates access to a motor vehicle. The running board assembly includes a plurality of mounting brackets fixedly secured to the motor vehicle and extending therebelow. The running board assembly also includes a step movably secured to the plurality of brackets. The step defines a stepping surface and a peripheral edge extending around a portion of the stepping surface. The step is movable between a deployed position providing access to the stepping surface and a stowed position wherein the peripheral edge abuts the motor vehicle covering the stepping surface and merges with the exterior of the vehicle as a rocker panel.

BRIEF DESCRIPTION OF THE DRAWINGS

Advantages of the invention will be readily appreciated as the same becomes better understood by reference to the following detailed description when considered in connection with the accompanying drawings wherein.

DETAILED DESCRIPTION OF THE PREFERRED EMBODIMENT

Figure 1:
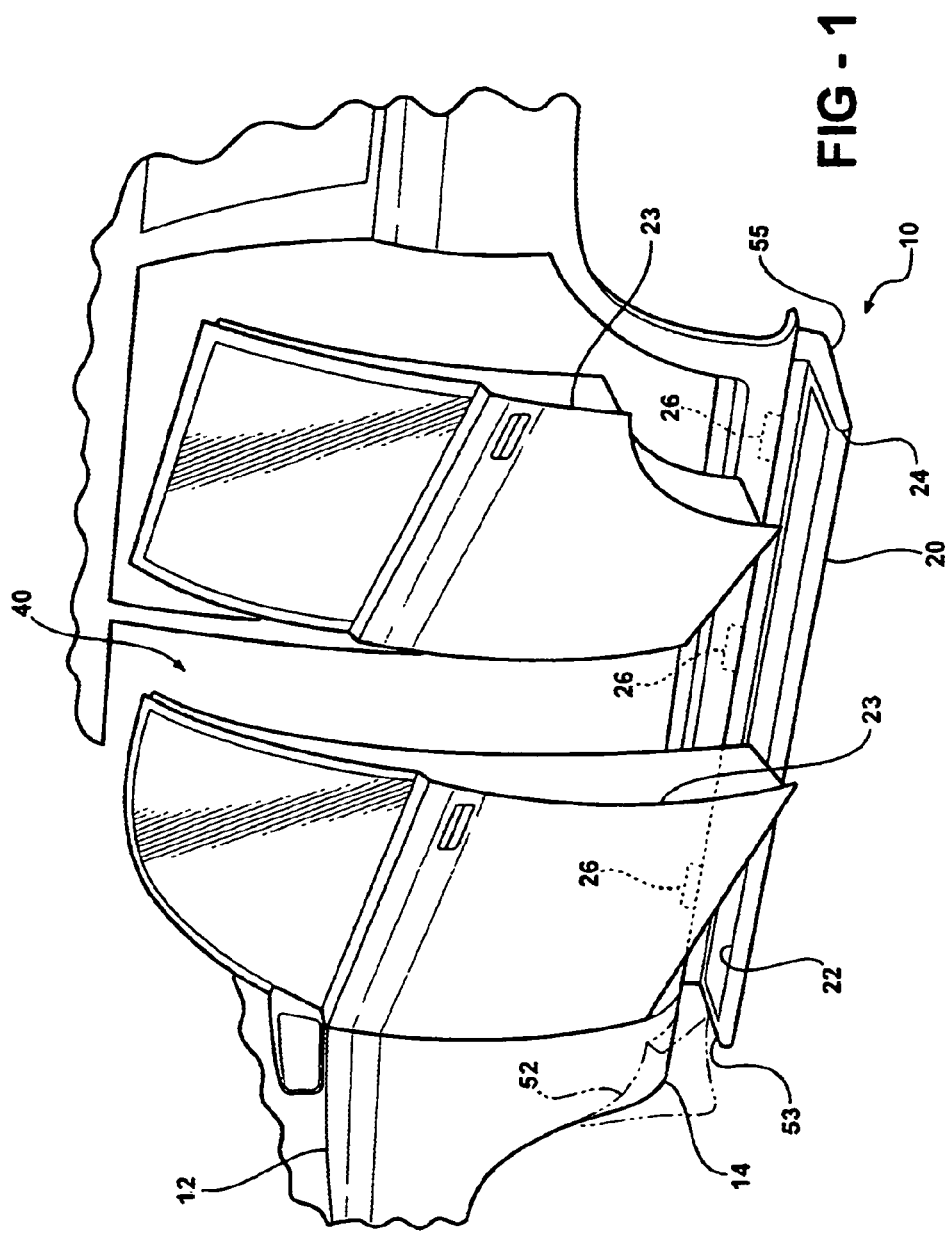
FIG. 1 is a side view of a motor vehicle and a running board assembly of one embodiment of the invention secured thereto.
Figure 2:
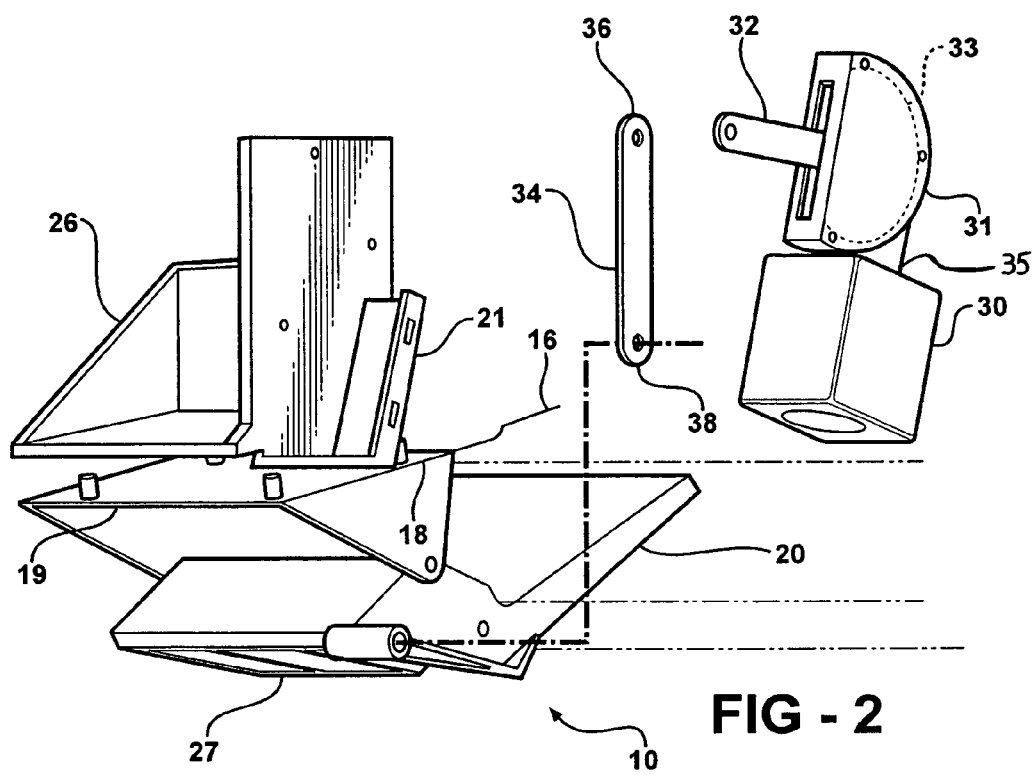
FIG. 2 is an exploded, rear perspective view of the running board assembly of one embodiment of the invention.
Figure 3:
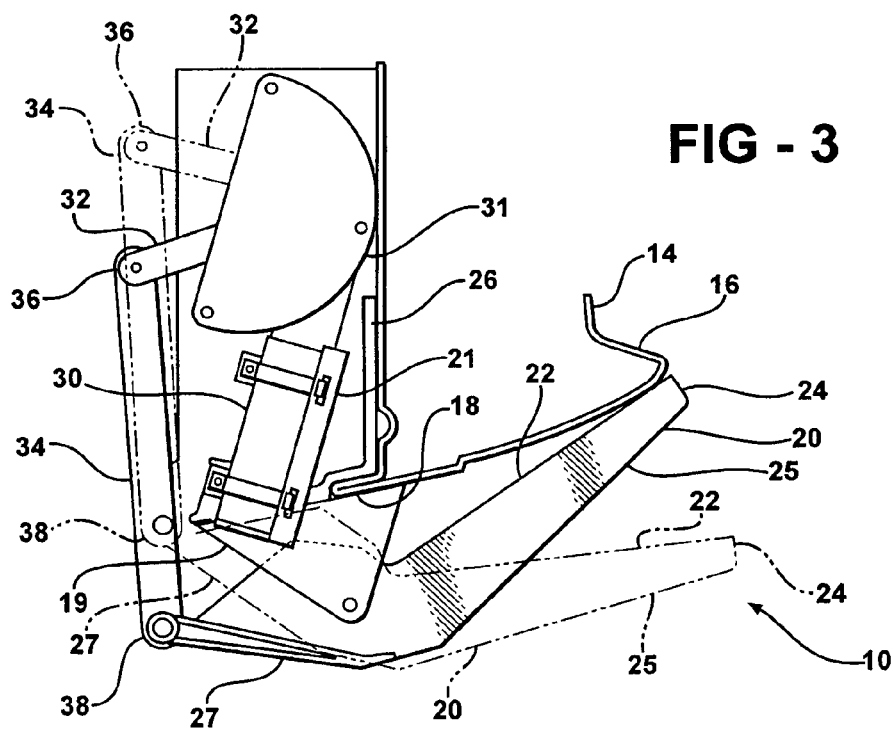
FIG. 3 is a side view of the running board assembly of one embodiment of the invention.

Referring to FIGS. 1–6, a first embodiment of the invention, a running board assembly, is generally indicated at 10. The running board assembly 10 extends longitudinally alongside a motor vehicle 12. The running board assembly 10 is secured to a body 14 of the motor vehicle 12. The body 14 includes an inner rocker panel 16 and a flange 18 extending away from the inner rocker panel 16, which also extends longitudinally alongside the motor vehicle 12. A plurality of supporting brackets 19 is secured to the rocker inner panel 16 and to the flange 18 by screws or other suitable fasteners. One of the plurality of supporting brackets 19 includes a motor support bracket 21 secured thereto for supporting a motor 30.

The running board assembly 10 includes a step 20 positioned below a door 23. The step 20 defines a stepping surface 22 for supporting individuals entering or exiting the motor vehicle 12, a peripheral edge 24 extending around at least a portion of the stepping surface 22, and a contoured underside surface 25. The step 20 is movable between a stowed position, in which a portion of the peripheral edge 24 abuts the motor vehicle 12 to cover the stepping surface 22 and merge with adjacent vehicle panels during non-use, such as when the door 23 is closed, and a deployed position when the door 23 is opened in which the stepping surface 22 is accessible to individuals entering or exiting the motor vehicle 12 (as shown in FIG. 1).

The step 20 also includes a cantilever arm 27 that extends out from the stepping surface 22. The cantilever arm 27 extends out of a plane defined by the stepping surface 22. The cantilever arm 27 is pivotally secured to each of the plurality of supporting brackets 19 to secure the step 20 to the motor vehicle 12. In addition, the cantilever arm 27 is operatively linked to a motor 30 for movement of the step 20 between its stowed and deployed positions.

The running board assembly 10 also includes a plurality of mounting brackets 26 secured to the motor vehicle 12. The plurality of mounting brackets 26 is spaced apart along the length of the step 20 and aligned with the plurality of supporting brackets 19. The plurality of mounting brackets 26 is secured to the body 14 of the motor vehicle 12. Alternatively, the plurality of mounting brackets 26 may be secured to a frame 28 of the motor vehicle 12. The plurality of mounting brackets 26 is preferably formed from injection or compression molded organic resins with long glass fibers. Alternatively, the brackets may be formed by stamped or formed metal, such as aluminum or steel.

The motor 30 is supported by the motor support bracket 21 of one of the plurality of supporting brackets 19. A transmission 31, including a transmission sector gear 33, is connected to a shaft 35 of the motor 30. The transmission 31 may couple the sector gear 33 and the shaft 35 by any suitable means commonly known to one skilled in the art, such as a worm gear on the shaft 35 meshed with the gears on the sector 33. The motor 30 includes a linking arm 32 extending therefrom. A linkage 34 has an upper end 36 and a lower end 38. The upper end 36 of the linkage 34 is secured to the linking arm 32 and the lower end 38 of the linkage 34 is secured to the step 20. Thus, the motor 30 is operatively connected to the step.

When the door 23 is opened, a dome light switch is closed to illuminate a passenger compartment 40 of the motor vehicle 12. The same dome light switch is used to activate the motor 30. The motor 30 moves the linkage 34 along a path to move the step 20 from the stowed position to the deployed position.

When an individual utilizes the step 20 during entering or exiting the motor vehicle 12, a load is placed thereon. This load is transferred from the step 20 to the plurality of mounting brackets 26, and then from the plurality of mounting brackets 26 to the rocker inner panel 16 and the flange 18 of the body 14. Alternatively, the running board assembly 10 can be secured directly to the frame 28, wherein the load is transferred from the plurality of mounting brackets 26 thereto. As a result of such load transfer from the step 20 to the motor vehicle 12, the running board assembly 10 is able to withstand the loads applied thereon.

When the door 23 is closed, the dome light switch is opened and responsively energizes the motor 30 in a sense opposite the opening sense. The motor 30 moves the linkage 34 to move the step 20 from the deployed position to the stowed position. In the stowed position, the step 20 has a rocker panel like appearance and will merge with adjacent vehicle body panels to appear as the rocker panel and conceal the step surface.

Figure 4:
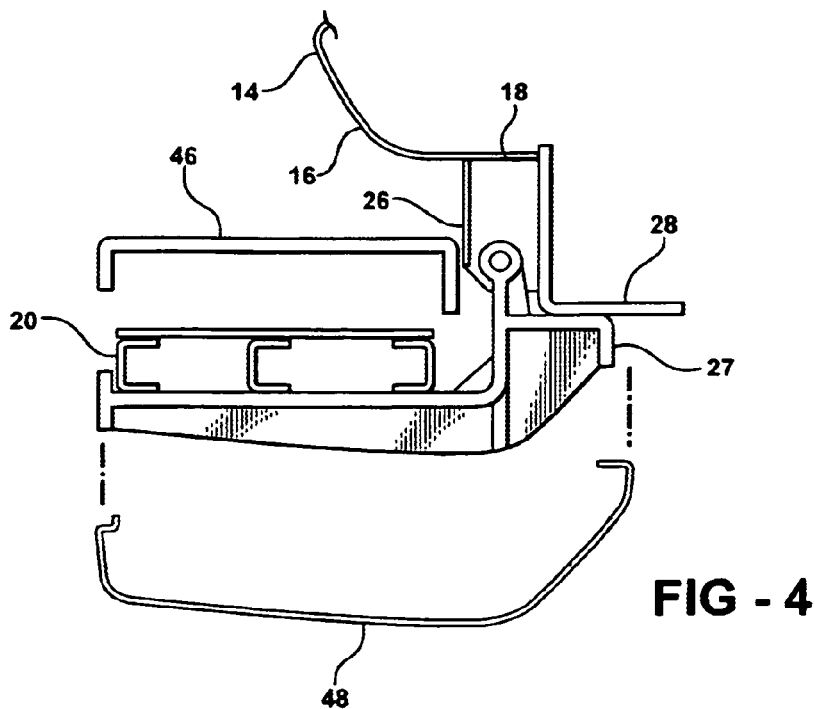
FIG. 4 is a side view of the running board assembly of one embodiment of the invention as well as top and outer covers to be secured thereto.

Referring to FIG. 4, the step 20 includes a top cover 46 and a bottom cover 48, both of which aid in structural support and provide a uniform appearance to the running board assembly 10. The top cover 46 is either extruded or injection molded, and the bottom cover 48 is formed from a thermoplastic polyolefin. Preferably, the bottom cover 48 is contoured in the shape of a rocker panel. A step pad cover (not shown) having a preformed grid pattern thereon may be secured over the top cover 46 to provide an individual with better traction when utilizing the step 20 for support.

Figure 5:
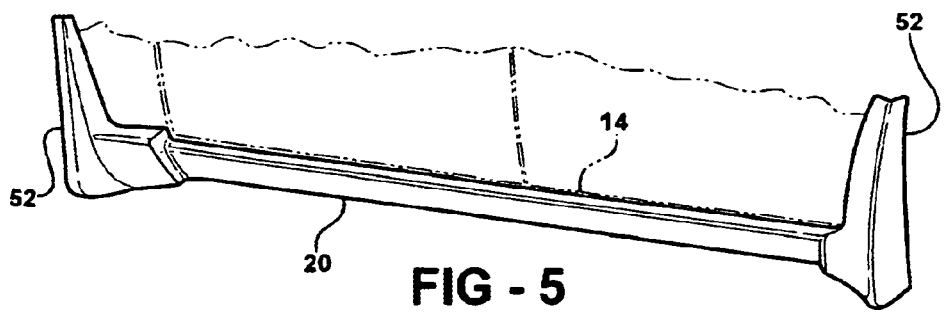
FIG. 5 is a perspective view of a plurality of mud guards secured to the running board assembly of one embodiment of the invention.
Figure 6:
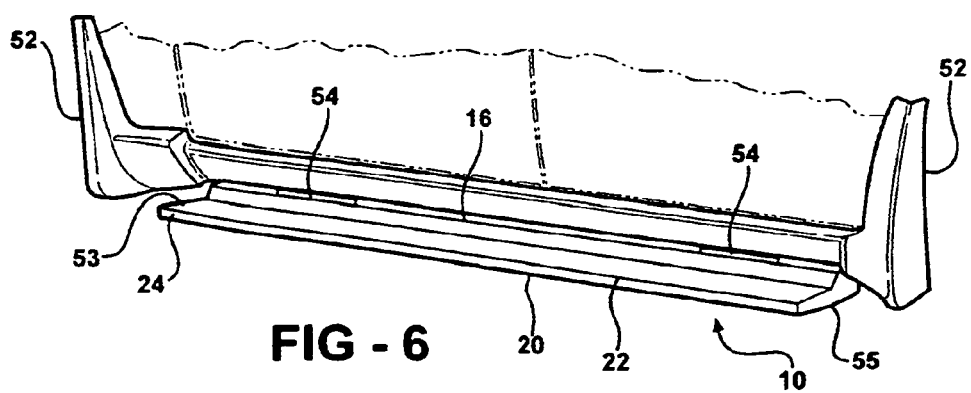
FIG. 6 is a perspective view of a running board assembly of one embodiment of the invention and a plurality of light mechanisms mounted thereto.

Referring to FIGS. 5 and 6, a plurality of mud guards 52 may be secured to the motor vehicle 12 to provide an additional barrier to the intrusion of mud and dirt onto the stepping surface 22. A plurality of light mechanisms 54 may be secured to the rocker inner panel 16 for illuminating the stepping surface 22. The plurality of lighting mechanisms 54 allows an individual entering or exiting the motor vehicle 14 at night or under low lighting conditions to see the step 20 below them, ensuring an initial contact of the individual's foot to the step 20. The plurality of light mechanisms 54 is not visible when the step 20 is in the stowed position because the step 20 abuts the motor vehicle 12. But when the step 20 moves from the stowed to the deployed position, the plurality of lighting mechanisms 54 becomes visible and illuminates the stepping surface 22. The plurality of lighting mechanisms 54 is turned on by a signal generated when the dome light switch is closed (which is when the door 23 is opened).

The plurality of mud guards 52 and the plurality of light mechanisms 54 can be add-on items for the running board assembly 10. The plurality of mud guards 52 and the plurality of light mechanisms 54 could also be part of a cladding package or trim package that is attached to the motor vehicle 12. In the embodiment shown in FIGS. 5 and 6, the plurality of mud guards 52 are designed to eliminate access to the stepping surface 22 via each step end 53, 55, when the step 20 is in its deployed position.

Figure 7:
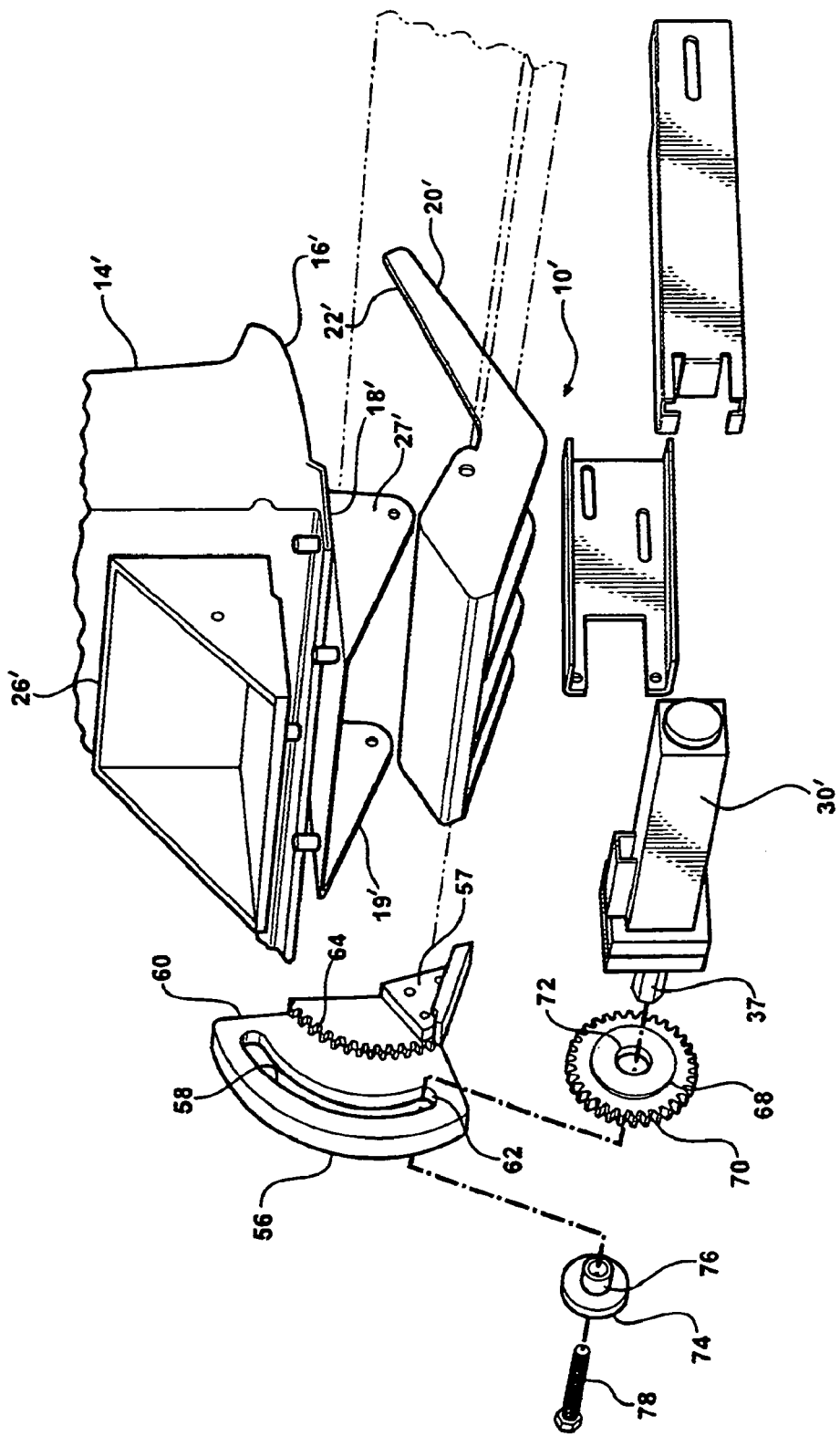
FIG. 7 is an exploded, rear perspective view of a running board assembly of a second embodiment of the invention.
Figure 8:
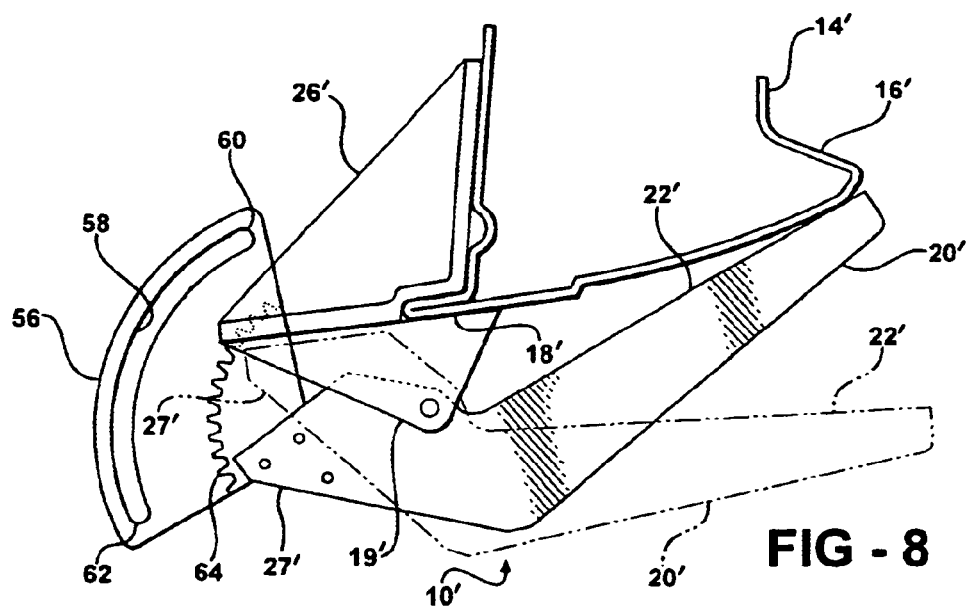
FIG. 8 is a side view of the running board assembly of the second embodiment of the invention.

Referring to FIGS. 7 and 8, wherein like primed reference numerals represent similar elements as those described above, a second embodiment of the invention is shown wherein the motor 30' drives a sector gear 56, which is operatively connected to the step 20', to move the step 20' between the stowed and deployed positions. The sector gear 56 includes an arm bracket 57 for securing the step 20' thereto. The sector gear 56 defines a slot 58 extending between an upper slot end 60 and a lower slot end 62 thereof. The sector gear 56 also includes an arcuate, toothed portion 64 therealong.

A circle gear 68 has a toothed portion 70 and defines an aperture 72 therethrough. A bushing 74 defines an aperture 76, through which a pin 78 extends.

The motor 30' includes a shaft 37 extending out therefrom, which extends through the aperture 72 of the circle gear 68 and rests within the slot 58 of the sector gear 56. At the same time, the toothed portion 70 of the circle gear 68 engages the arcuate, toothed portion 64 of the sector gear 56. On the other side of the sector gear 56, the bushing 74, with the pin 78 extending therethrough, is aligned with the aperture 72 of the circle gear 68. The pin 78 extends through the aperture 72 to secure the motor 30' and the circle gear 68 to the sector gear 56.

In operation, the step 20' is initially in the stowed position. The peripheral edge of the step 20' abuts with the inner rocker panel 16' and merges smoothly thereto. The pin 78 abuts the lower slot end 62 of the slot 58. The motor 30' is activated by the opening of the door 23. The activation of the motor 30' causes the sector gear 56 to travel downwardly with respect to the motor 30' because the toothed portion 70 of the circle gear 68 engages the arcuate, toothed portion 64 of the sector gear 56. The downward movement of the sector gear 56 causes the step 20' to move from the stowed position to the deployed position. When the upper slot end 60 of the slot 58 receives the shaft 37 of the motor 30', the step 20' is in the deployed position. At this time, an individual may use the step 20' to support themselves during entering or exiting the motor vehicle 12.

Figure 9:
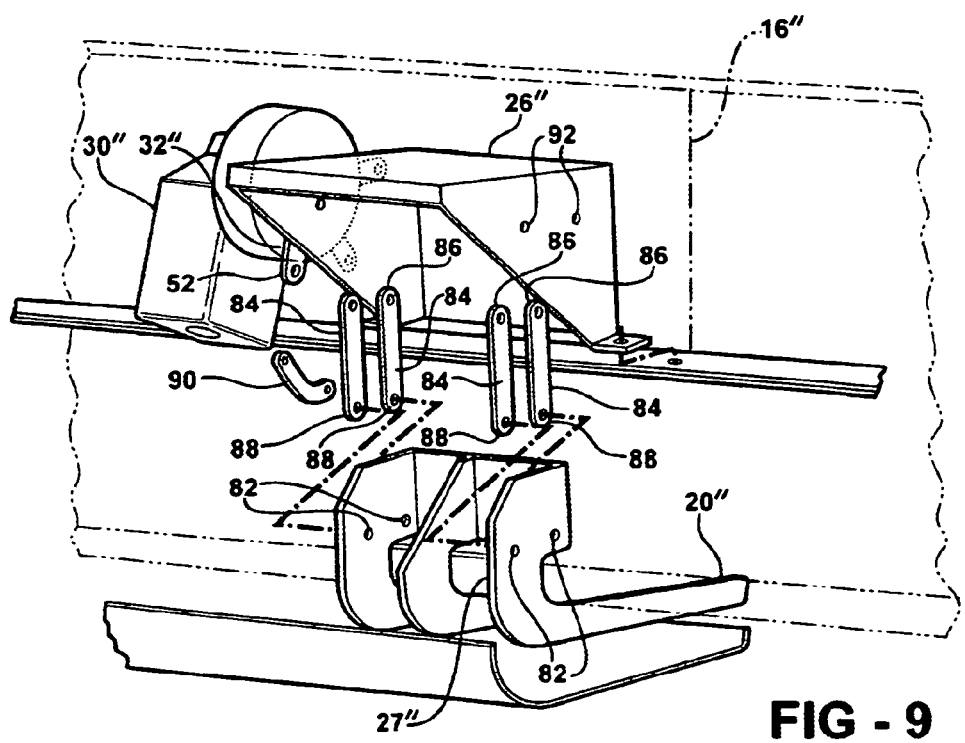
FIG. 9 is a rear perspective view of a running board assembly of a third embodiment of the invention.

Referring to FIG. 9, wherein like double primed reference numerals represent similar elements as those described above, a third embodiment of the invention is shown including a plurality of links 84 having an upper link end 86 and a lower link end 88. The cantilever arm 27" defines a plurality of apertures 82, which is aligned with the lower link end 88 of the plurality of links 84 to create a four bar linkage. A plurality of mounting apertures 92 defined by each of the plurality of mounting brackets 26" are aligned with the upper link end 86 of the plurality of links 84. Thus, the plurality of links 84 interconnect the cantilever arm 27" and the motor vehicle 12". A linking bracket 90 is secured to the linking arm 32" of the motor 30" to connect the motor 30" to the plurality of links 84, and to operatively connect the motor 30" and the step 20". Upon activation of the motor 30", the plurality of links 84 moves the step 20" between its deployed and stowed positions.

Figure 10:
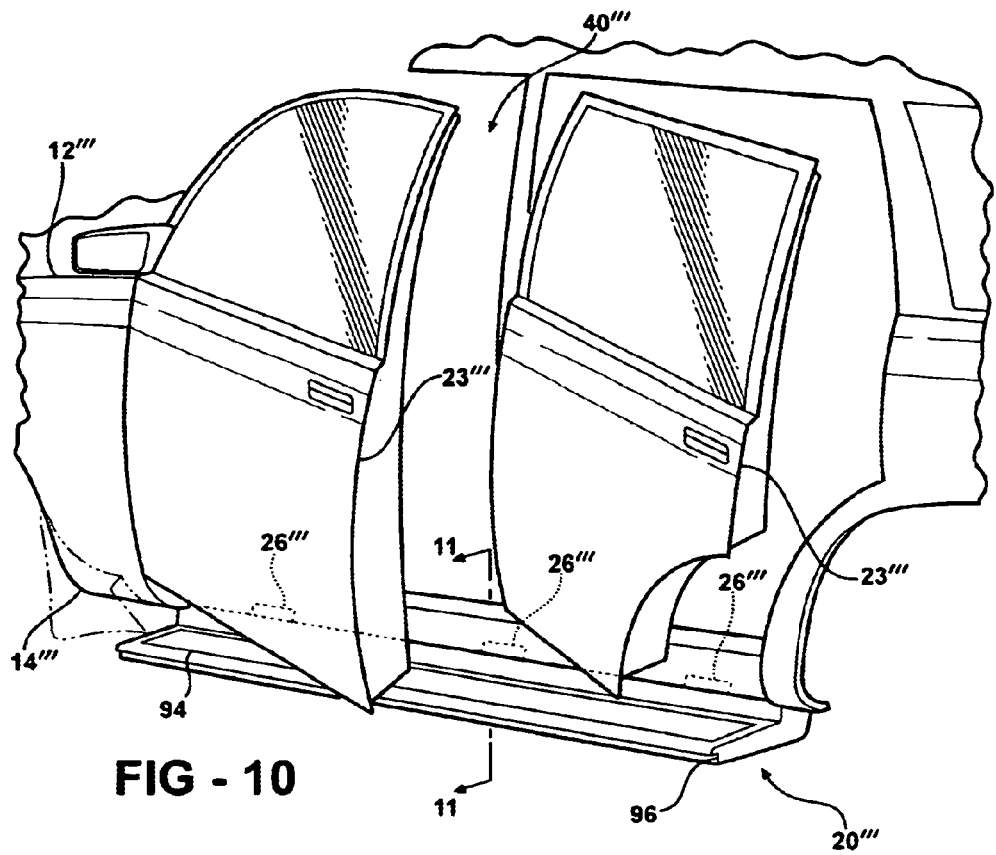
FIG. 10 is a side view of a motor vehicle and a running board assembly of a fourth embodiment of the invention.
Figure 11:
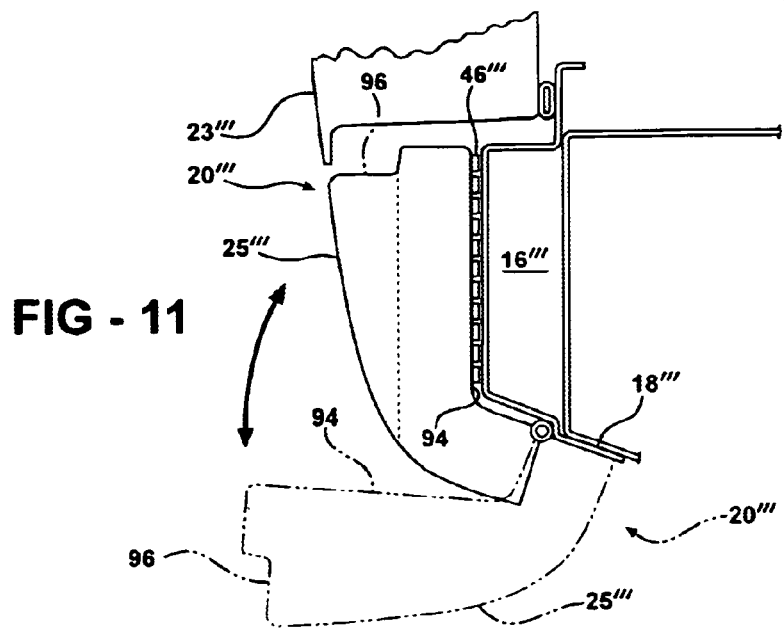
FIG. 11 is a cross-sectional, side view taken along lines 11—11 of FIG. 10.

Referring to FIGS. 10 and 11, wherein like triple primed reference numerals represent similar elements as those described above, in a fourth embodiment of the invention the inner rocker panel 16''' defines a panel stepping surface 94 for supporting an individual entering or exiting the motor vehicle 12'''. The inner rocker panel 16''' defines a peripheral panel edge 96 extending around at least a portion of the stepping surface 22. The body 14''' includes a structural inner rocker panel 16''' and the flange 18''', which together receive the load that is generated when the individual steps onto the panel stepping surface 94. The step 20''' may be moved between a deployed position and a stowed position in a similar fashion as that of the step 20' in the second embodiment of the invention and the step 20" in the third embodiment of the invention.

It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed is:

1. A running board assembly for accommodating access to a motor vehicle, said running board assembly comprising:
   a plurality of mounting brackets fixedly secured to a motor vehicle;
   a step movably secured to said plurality of mounting brackets, said step having a cantilever arm extending out therefrom and defining a stepping surface, a peripheral edge extending around said step, and a contoured surface opposite said stepping surface shaped to provide an inner rocker panel appearance, said step movable between a deployed position providing access to said stepping surface and a stowed position wherein a portion of said peripheral edge abuts the motor vehicle and said contoured surface merges with adjacent vehicle panels;
   a linkage secured to said step for defining a path of travel for said step between said deployed and stowed positions;
   a motor operatively connected to said linkage for moving said linkage and said step; and
   a transmission having a sector gear secured to said step and operatively engaging said motor, said sector gear having an arcuate toothed portion and defining a slot having upper and lower slot ends.

2. A running board assembly as set forth in claim 1 including a circle gear operatively connected to said motor, said circle gear defining a toothed portion engaging said arcuate, toothed portion of said sector gear such that upon activation of said motor said sector gear travels between said upper and lower ends to move said step between its stowed and deployed positions.

* * * * *